Feb. 9, 1971     F. A. RODGERS     3,562,116
APPARATUS FOR INCREASING THE CONCENTRATION OF A LESS
VOLATILE LIQUID FRACTION IN A MIXTURE OF LIQUIDS
Filed Nov. 1, 1967
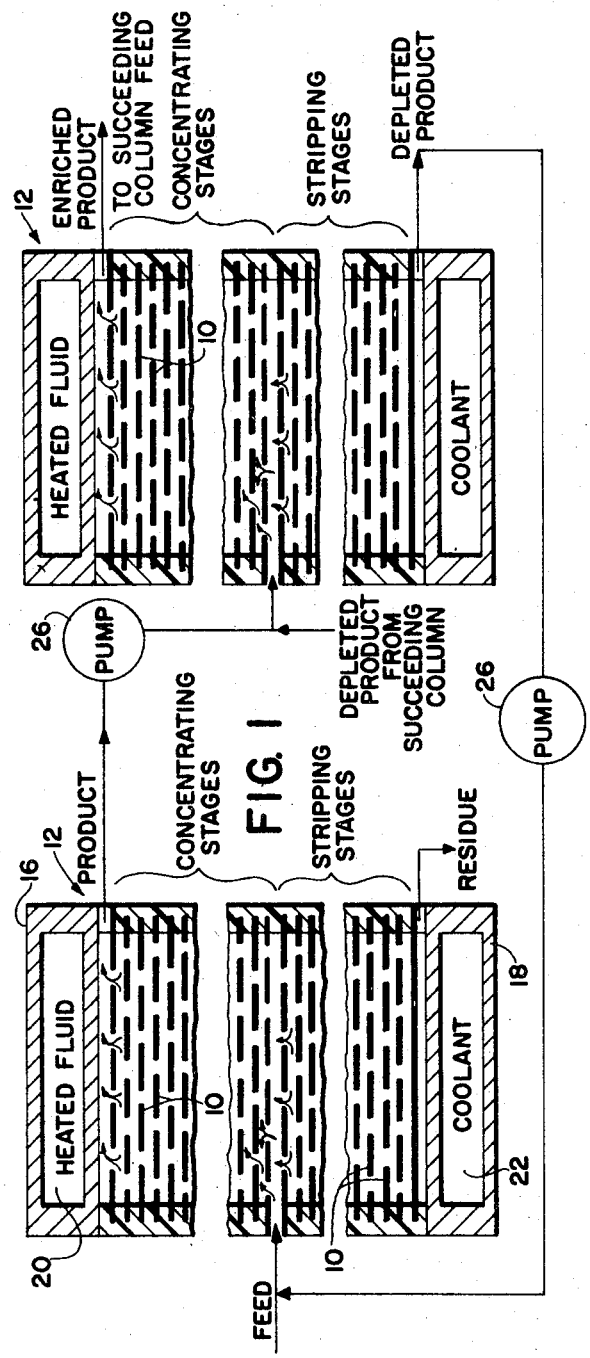
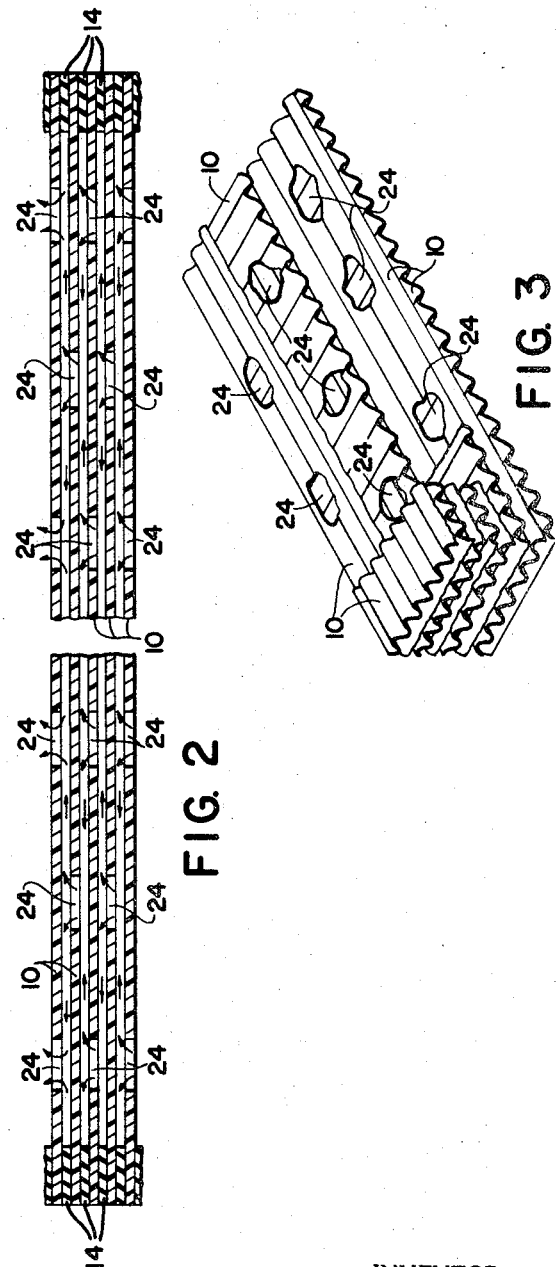
INVENTOR.
Franklin A. Rodgers
BY Brown and Mikulka
and
Robert E. Corb
ATTORNEYS

United States Patent Office 3,562,116
Patented Feb. 9, 1971

3,562,116
APPARATUS FOR INCREASING THE CONCENTRATION OF A LESS VOLATILE LIQUID FRACTION IN A MIXTURE OF LIQUIDS
Franklin A. Rodgers, Cambridge, Mass., assignor to Pactide Corporation, Cambridge, Mass., a corporation of Delaware
Filed Nov. 1, 1967, Ser. No. 679,916
Int. Cl. B01d 1/22, 1/26; C021 1/06
U.S. Cl. 202—200        11 Claims

ABSTRACT OF THE DISCLOSURE

Apparatus for increasing the concentration of a less volatile liquid fraction in a mixture of the liquid and a more volatile liquid, and particularly for the concentration of heavy water in a mixture including ordinary water. The apparatus comprises a multiplicity of microporous membranes substantially impermeable to the liquids of the mixture and permeable to the vapors of the liquids, sandwiched together to form a column between means located at the ends of the column for creating a temperature gradient across the column. The mixture is introduced into a medial section of the column and circulated toward the hotter end thereof as thin films between adjacent membranes to cause flow of the less volatile (higher boiling point) fraction toward the hotter end of the column and flow of the more volatile (lower boiling point) fraction toward the colder end resulting in stripping or depletion of the lower boiling point fraction in the colder portion of the column and concentration or enrichment in the hotter portion of the column.

---

Existing systems for isotope concentration and particularly for the concentration of deuterium require a very large capital investment represented by the cost of elaborate and extensive equipment as well as a relatively large quantity of the isotope, e.g., heavy water, in the form of "hold-up" in the system which frequently amounts to the major part of one year's production.

An object of the present invention is to provide a system for concentrating a liquid fraction having a simple and inexpensive construction and requiring a very small investment in the product hold-up in the system.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

The apparatus embodying the invention includes, as a basic component thereof, a multiplicity of microporous membranes such as described in the copending U.S. patent application of Franklin A. Rodgers, Ser. No. 524,366, filed Dec. 27, 1965, and operates according to essentially the same basic principles as the distillation apparatus described in the Rodgers application. The microporous membrane is a thin, porous polymeric film having a high percentage of voids in the form of microscopic passages extending completely through the membrane. The pores or passages contain substantially only gases and are of a size such that they will readily pass gases including the vapor of a particular liquid such as water, but will not pass the liquid in the absence of a substantial hydrostatic pressure differential. This impermeability of a membrane to the liquid is a function of pore size, surface tension of the liquid, and contact angle which, as described in the aforementioned application, are determined according to well-known physical principles governing the flow of liquids by capillary action, to enable the employment of a membrane having the largest possible pores consistent with the impermeability to the liquid. The porous membrane functions as a liquid-impermeable, vapor-permeable barrier between a body of a liquid mixture such as saline water or heavy and ordinary water, and another body of liquid including a higher proportion (up to 100%) of the more volatile liquid fraction. The liquids are circulated as thin films in direct contact with opposite sides of the membrane to vaporize the liquid, and heat is transferred from the liquid on the opposite side of the membrane causing the vapors to pass through the membrane and be condensed on the cooler side thereof.

A single microporous membrane with layers of liquid in contact with opposite surfaces and means for transferring heat to and from the layers of liquid constitute a still which lends itself advantageously to multiple staging in which a plurality of the porous membranes are arranged in face-to-face relation. Heat is transferred from the liquid on the hot side of each membrane to the liquid on the cold side of the membrane of the next succeeding stage so as to form a multiple-effect still comprising a multiplicity of distillation stages, each including a microporous membrane, wherein heat is the force which drives the vapors across the barrier between adjacent layers of liquid. The distillation or fractionating apparatus thus constituted is characterized by efficiencies which compare favorably with those of more complex and expensive existing structures because heat transfer is optimized by circulating the liquids as relatively thin films, and liquid circulation is optimized by supporting the thin films of liquids only externally, that is, at their two major outer surfaces. Because a large number of membranes may be assembled to form a multiple-effect still which is quite small and compact, the apparatus is operated at or near ambient pressure and the operating temperatures do not, as a rule, exceed the boiling point of the liquid, e.g., water, the distillation or fractionating apparatus itself as well as the supporting equipment are substantially less complex and expensive than existing apparatus.

Reference is now made to the drawing wherein:

FIG. 1 is a somewhat schematic sectional view of fractionating apparatus embodying the invention;

FIG. 2 is an enlarged fragmentary sectional view of the apparatus; and

FIG. 3 is a fragmentary perspective view, partially in section showing an alternative embodiment of the apparatus.

The basic component of the fractionating apparatus of the invention is a microporous membrane, designated 10, preferably formed of a polymeric material which, in membrane form, is non-wettable or at least poorly wettable by the liquid, e.g., water, for which the apparatus is designed. Desirable characteristics of the membrane are minimum thickness consistent with the requisite structural strength; high resistance to the passage of liquids; low resistance to the passage of gases; a high proportion of voids; high resistance to conductive heat flow; inertness with respect to the liquid; low absorptivity of the liquid; physical strength and integrity at elevated tempeartures in the presence of a liquid; and uniformity with respect to the physical properties, especially thickness, pore size and distribution and thermal conductivity. As an example, a membrane found to be useful in apparatus constructed according to the invention for increasing the concentration of heavy water in a mixture of heavy water and ordinary water, is formed of poly-1,1-vinylidene fluoride having a thickness of approximately .005 inch, including approximately 75 percent voids and characterized by an ooze point for water of 20 p.s.i. and air flow rate of the order of one liter per minute per square centimeter. Membranes of this material and type have a surface which, on a microscopic scale, is quite rough, and have been found to exhibit contact angles in excess of 90°, so that effectively, they are non-wettable by water. For a more detailed description of a method of manufacturing a membrane of the foregoing type, reference may be had to the copending U.S. patent application of James L. Bailey et al., Ser. No. 557,993, filed June 16, 1966.

The basic unit of the apparatus of the invention comprises a multiplicity of membranes 10 arranged in face-to-face stacked relation to form a column generally designated 12, in which the membranes are disposed in generally parallel relation and spaced from one another by shallow passages having depths of the order of the thickness of the membranes, e.g., .003–.005 inch, to provide channels through which a mixture such as ordinary water and heavy water may be circulated as thin films supported at their outer boundaries by and in direct contact with the microporous membranes. As previously noted, this arrangement of membranes for circulating the liquid as thin films is advantageous because of the improved heat transfer thus obtained and the fact that there is nothing between the membranes to interfere with the circulation of the liquid mixture.

The membranes may take any convenient form including circular or rectangular, are generally coextensive in area with one another, and are sealed together at their margins by gaskets 14 to prevent the escape of liquid from between the membranes at the margins thereof. The gaskets may be formed of a polymeric or elastomeric material having good adherent properties with respect to the membrane and preferably being thermosetting although compositions such as epoxy resin and silicon rubber, adapted to be applied in a liquid state or a solid thermoplastic state, may be preferred because their ease of formation and for reasons which will appear hereinafter. By way of example, gasket materials found to be useful in apparatus of this type because of their adherent properties and the ease with which gaskets can be formed include adhesive compounds of nitrile and urethane elastomers sold by B. F. Goodrich Company under the designations, respectively, A–178–B and A–1247–B.

Means for transferring heat to the column and transferring heat from the column are provided at opposite ends of the column for creating a temperature gradient across the column. In the form shown, these means comprise blocks 16 and 18 at opposite ends of the column providing chambers 20 and 22 through which, respectively, a heated fluid such as steam, and a coolant fluid such as water, may be circulated. The specific construction of the means for transferring heat to and from the column is unimportant as long as the means are constructed and arranged so as to transfer heat to and from the end layers or films of the liquid being circulated through the column and provide for a fairly constant temperature gradient.

The membranes comprising the column, with the exception of the end membrane closest the cold end, are provided with openings or holes 24 to permit the mass circulation or flow of the liquid towards the hot end of the column of membranes. The hole patterns in adjacent membranes are staggered with respect to one another so that each hole in a given membrane is uniformly spaced from its nearest neighbors in the adjacent membranes to provide for a circulation of the liquid between adjacent membranes in a direction generally parallel with the membranes and normal to the direction of the temperature gradient across the membranes. In the example of the apparatus given useful for concentrating heavy water, the holes in the membranes may be of the order of one-sixteenth inch in diameter and spaced from one another to provide for substantial circulation and uniform distribution of liquid between adjacent membranes.

The operation of the apparatus depends upon the difference in boiling points of the liquid fractions making up the mixture to be enriched in one of the fractions, which in the case of heavy water, for example, is 1.42° C. Heat is transferred to the mixture of liquids on one side of a membrane, tending to vaporize the liquid, primarily, the fraction of the liquid haivng the lower boiling point. As a result, the mixture on the hot side of a membrane will be depleted by a portion of the lower boiling point fraction and conversely will contain a greater proportion of the higher boiling point fraction. This depletion-concentration effect takes place at each membrane of the column so that the net effect is bulk flow of the liquid mixture toward either or both ends of the column and flow of the vapor of the lower boiling point fraction toward the cold end of the column.

In the preferred form of the apparatus shown in the drawings, feed liquid, e.g., a mixture of $D_2O$ and $H_2O$, is introduced into the column between membranes in the region of the medial portion of the column, and the liquid mixture is circulated toward the hot end of the column and withdrawn therefrom adjacent block 16. Thus, bulk flow of liquid from the medial portion of the column is toward the hot end of the column while mass flow of the vapors of the lower boiling point fraction, e.g., ordinary water, is toward the cool end of the column or block 18. Vapor transferred through the end membrane which is closest block 18 and imperforate to flow of bulk liquid is condensed and withdrawn as liquid from the column adjacent the cooling block. The rate of vapor transfer across the membranes at constant heat energy flux is an increasing function of temperature so that the quantity of liquid transferred by evaporation to a layer of liquid is greater than the quantity of liquid transferred by evaporation from the layer of liquid. Since the membrane closest the cold end of the column is imperforate, liquid flow is toward the hot end of the column. The membranes located toward the cool end of the column function to strip heavy water from the bulk mixture, and membranes located between the point of introduction of feed liquid and the hot end of the column function to concentrate the heavy water in the mixture of heavy water and ordinary water. The product consisting of water enriched with heavy water is withdrawn from the hot end of the column and the residue or mixture depleted by heavy water, is withdrawn from the column at the cool end thereof. The proportion of stripping stages to concentrating stages in a column may be 1:1 or may be varied as desired.

The feed, product and residue (depleted product) liquids are introduced into and withdrawn from the column through channels provided in gaskets 14 between adjacent membranes. The supporting equipment for a column includes the necessary conduits connected by means, such as conventional manifolds, to the channels through the gaskets, together with means, such as pumps 26, for circulating the liquids through the column. A typical column designed for the concentration of heavy water may be operated between ambient temperature and the boiling point of water so that the auxiliary equipment should include means for circulating a coolant through chamber 22 and block 18 and supplying a heated fluid such as steam to chamber 20 of block 16. Blocks 16 and 18 themselves may be secured to one another and thereby function to hold the membranes in spaced relation in the column which may require no other means for retaining its integral condition inasmuch as the hydrostatic pressure of the liquids within the column is close to ambient pressure and may exceed ambient pressure only by the amount necessary to effect circulation of the liquid through the column.

A single column constructed and operated in accordance with the invention will be characterized by particular concentration and stripping factors, that is factors by which the concentration of the higher boiling constituent in the mixture is, respectively, increased (multiplied) and reduced (divided). In a typical situation in which the initial concentration of the higher boiling constituent is relatively small, a complete plant or system will comprise a plurality of columns coupled in a cascade relationship (as seen in FIG. 1) in which the concentrated product of each column is circulated as the feed of the next succeeding column and the depleted feed of each column is recirculated as the feed of the preceding column. The total number of membranes in each column as well as the numbers of membranes in the concentrating and stripping stages are dependent upon the concentration and stripping factors to be attained; and the number and capacities of the columns coupled together to form a complete plant or system will be dependent upon the concentration and stripping factors and output of the individual columns and the ultimate concentration to be attained. Succeeding stages or columns after the first will have successively smaller capacities each equal to the output of the preceding column, although each column may have the same concentration and stripping factors as every other column. The number of columns and the ultimate concentration of the higher boiling fraction will depend upon economics and particularly, a trade-off between concentration factors, capital costs and quantity of product, as will appear in a subsequent example.

Various constructions are possible for spacing adjacent membranes apart from one another to provide channels between the membranes through which the liquid may be circulated substantially as thin films. One expedient is to corrugate alternate membranes so that the alternate membranes have a generally sinusoidal cross sectional configuration and each corrugated membrane functions as a spacer between it and the adjacent membranes. In this form of the apparatus, the flow of the liquid between adjacent membranes will tend to be linear and in a direction parallel with the corrugations.

In an alternative embodiment shown in FIG. 3, all the membranes are corrugated and are arranged with the corrugations in adjacent membranes extending at right angles to one another. This arrangement has the advantage of permitting circulation of the liquid between adjacent membranes in substantially any direction. A membrane according to the example given, i.e., 0.005 inch thick, may be formed with sinusoidal corrugations having an amplitude of the order of 0.010 inch and a wave length of the order of a 0.012 inch. This general configuration is shown and described in the copending U.S. patent application of Franklin A. Rodgers, Ser. No. 553,190, filed May 26, 1966, and is particularly desirable because of the ease with which it can be achieved and its resistance to compression when incorporated in a column. Gasket materials in fluid form or capable of being liquefied or softened by heat are particularly useful in combination with corrugated membranes because of their ability to flow into and fill the corrugations.

A typical system designed for the concentration of heavy water in a mixture of ordinary water and operated with a temperature differential ranging from ambient to the boiling point of water, includes a column having a total of approximately 55 membranes, each 0.005 inch thick with films of water between adjacent membranes of the order of 0.003–0.005 inch deep so that the total "height" of the column (exclusive of the heat transfer means) will not exceed 0.5 inch. A column constructed according to this example will have a concentration factor and a stripping factor each of the order of four, that is, the heavy water concentration in the product is four times that in the feed while 75% of the heavy water in the feed is recovered. As previously noted, the number of cascaded columns in a complete system or plant and the concentration of the higher boiling point constituent in the product of such a plant will be dependent upon the economic factors which determine the cost of the ultimate product. When the initial concentration is very small as in the case of heavy water in feed water, a system such as described may be more economically desirable despite its relatively low concentration factor because of its very small capital cost and its equally small operating cost. More expensive systems having higher concentration factors become economically justified when the initial concentration of the higher boiling point constituent is relatively high.

It is this trade-off between concentration factor and plant cost which determines the number of columns in and the concentration of the product of the heavy water system of the example, and on this basis, it is contemplated that a complete heavy water concentrating plant or system might consist of six stages or columns of the type described each having a capacity one-quarter that of the preceding column. Such a plant would concentrate an ordinary mixture of water and heavy water to 50 molal percent heavy water at which concentration, other and substantially more costly systems having higher concentration ratios might prove to be more economical. Advantages of such a plant include the fact that the total plant hold-up would be of the order of six to seven hours and any desired amount of total plant capacity may be obtained merely providing additional system or plants with six columns each, coupled in parallel with one another. This plant would have the additional advantage that the individual six column units could be shut down for repairs or replacement without interfering with the production of the remaining units and when unit production is small compared with total capacity, the shut down of one or a few units would have negligible effect on total production.

The most important advantages of a system of this type become apparent when it is compared with a typical prior art distillation plant which may comprise a tower having 44 stages and a height of 200 feet, heavy water recovery of 1.9% and a hold-up time of the order of 75 days. The vast difference between the complexity, size and cost of the apparatus of the invention and prior art system is substantial while the difference in complexity and cost of the supporting equipment for the two systems is correspondingly great.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Apparatus for increasing the concentration of a liquid fraction in a mixture of said liquid fraction and a more volatile liquid fraction comprising, in combination:

a multiplicity of thin, porous membranes each including a multiplicity of microscopic, gas-filled, through passages capable of passing the vapors of said liquids while preventing the passage of said liquids as liquids;

said membranes being assembled in spaced face-to-face relation to form a column;

means for introducing said liquid mixture between a pair of said membranes intermediate the ends of said column and circulating said liquid mixture as thin films between successive pairs of said membranes in contact with opposite sides of each of said membranes and causing bulk flow of said liquids toward one end of said column;

means for transferring heat to the film of said liquid mixture nearest said one end of said column to cause vapor of said more volatile liquid fraction to pass through pores of each of said membranes toward the other end of said column to the film of said liquid on the opposite side of said each membrane;

means for transferring heat from the film of said liquid mixture nearest said other end of said column to condense said vapors of said more volatile liquid fraction transferred through said pores of each of said membranes;

means for withdrawing said liquid mixture enriched by the less volatile liquid fraction from said column near said one end thereof and causing bulk flow of said liquid toward said one end; and means for removing bulk liquid depleted by said less volatile fraction from said other end of said column.

2. Apparatus as defined in claim 1 including means for spacing said porous membranes apart to provide channels between adjacent membranes through which said liquid mixture is circulated as thin films.

3. Apparatus as defined in claim 1 wherein each of said porous membranes except said membrane nearest said other end of said column is formed with a plurality of openings for permitting said liquid mixture to flow within said column between successive pairs of said membranes toward said one end of said column.

4. Apparatus as defined in claim 3 wherein said openings in each of said membranes are staggered with respect to said openings in adjacent membranes to cause said liquid mixture to flow as a thin film between adjacent membranes.

5. Apparatus as defined in claim 3 wherein said means at said other end of said column for withdrawing said liquid depleted by said less volatile liquid fraction comprise said membrane nearest said other end of said column and means for withdrawing liquid transferred as vapor through the last-mentioned membrane and condensed on the cold side thereof.

6. Apparatus as defined in claim 1 wherein at least alternate membranes are corrugated to provide channels for circulating said liquid mixture between said membranes.

7. Apparatus as defined in claim 6 wherein said membranes are corrugated and the corrugations of each membrane extend at an angle with respect to the corrugations of adjacent membranes.

8. Apparatus as defined in claim 1 wherein said membranes are substantially impermeable to water in the absence of a substantial hydrostatic pressure differential across said membranes.

9. Apparatus as defined in claim 8 wherein said membranes are non-wettable by water.

10. Apparatus as defined in claim 1 including at least a second of said columns having substantially the same construction and designed to function in the same manner as the first-mentioned column;

means for introducing said liquid mixture, enriched by said less volatile fraction and withdrawn from said first-mentioned column, between a pair of membranes intermediate the ends of said second column and circulating said enriched liquid mixture as thin films between successive pairs of said membranes of said second column with bulk flow being toward said one end of said second column; and means for withdrawing said liquid mixture enriched in said less volatile fraction from said second column near said one end of said second column.

11. Apparatus as defined in claim 10 including means for withdrawing said liquid mixture depleted by said less volatile fraction from said second column nearer said other end thereof and introducing said depleted liquid mixture into said first-mentioned column.

References Cited

UNITED STATES PATENTS

| | | | |
|---|---|---|---|
| 2,268,134 | 12/1941 | Clusius | 210—72X |
| 2,712,386 | 7/1955 | Jones et al. | 210—72 |
| 3,279,533 | 10/1966 | Kersteter et al. | 202—197X |
| 3,340,186 | 9/1967 | Weyl | 210—22 |
| 3,342,729 | 9/1967 | Strand | 55—16X |
| 3,398,091 | 8/1968 | Greatorex | 210—23 |

NORMAN YUDKOFF, Primary Examiner

J. SOFER, Assistant Examiner

U.S. Cl. X.R.

202—174, 236; 159—13